United States Patent [19]
Frees et al.

[11] Patent Number: 5,905,608
[45] Date of Patent: May 18, 1999

[54] DYNAMICALLY TUNED OUTER ARMS FOR IMPROVED ROTARY ACTUATOR PERFORMANCE

[75] Inventors: Gregory Michael Frees, Los Altos; Fu-Ying Huang; Hatem Radwan Radwan, both of San Jose, all of Calif.

[73] Assignee: International Business Machines Corporation, Armonk, N.Y.

[21] Appl. No.: 08/933,697

[22] Filed: Sep. 19, 1997

[51] Int. Cl.⁶ .......................... G11B 21/02; G11B 21/21
[52] U.S. Cl. .......................... 360/106; 360/104
[58] Field of Search .................... 360/103–109, 360/97.01, 97.02, 98.01

[56] References Cited

U.S. PATENT DOCUMENTS

| | | | |
|---|---|---|---|
| 4,933,791 | 6/1990 | Cheng | 360/104 |
| 4,942,491 | 7/1990 | Osawa et al. | 360/104 |
| 4,943,875 | 7/1990 | Reidenbach et al. | 360/104 |
| 5,014,142 | 5/1991 | Nakanishi et al. | 360/98.01 |
| 5,014,145 | 5/1991 | Hosokawa et al. | 360/104 |
| 5,068,959 | 12/1991 | Sidman | 29/603 |
| 5,161,077 | 11/1992 | Jabbari | 360/106 |
| 5,268,805 | 12/1993 | Peng et al. | 360/106 |
| 5,438,747 | 8/1995 | Krounbi et al. | 29/603 |
| 5,452,164 | 9/1995 | Cole et al. | 360/113 |
| 5,459,921 | 10/1995 | Hudson et al. | 29/603 |

FOREIGN PATENT DOCUMENTS

| | | |
|---|---|---|
| 60-106002 | 6/1985 | Japan . |
| 1-113966 | 5/1989 | Japan . |
| 2-306477 | 12/1990 | Japan . |
| 4-92270 | 3/1992 | Japan . |
| 4-134764 | 5/1992 | Japan . |
| 4-216376 | 8/1992 | Japan . |
| 6-251518 | 9/1994 | Japan . |
| 8-287625 | 11/1996 | Japan . |

*Primary Examiner*—William J Klimowicz
*Attorney, Agent, or Firm*—Noreen A. Krall

[57] ABSTRACT

An actuator assembly for a magnetic storage system wherein the end arms are dynamically tuned to reduce the modes of vibration on the actuator to improve the performance and stability of the actuator assembly in the magnetic storage system. In one embodiment, the upper and lower outer arms of the actuator assembly are thinned in the same or similar locations. In another embodiment, the upper and lower outer arms of the actuator assembly are notched at high strain energy points to reduce the stiffness of the outer arms. In still another embodiment, the upper and lower outer arms of the actuator assembly are both notched and thinned at the same or similar locations.

44 Claims, 7 Drawing Sheets

DYNAMICALLY TUNED OUTER ARMS FOR IMPROVED ROTARY ACTUATOR PERFORMANCE

BACKGROUND TO THE INVENTION

1. Field of the Invention

This invention relates generally to computer hard disk drives and, more particularly, to improvements to the rotary actuator of hard disk drives for better dynamic performance.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus the suspension provides desired slider loading and dimensional stability between the slider and an actuator positioner arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single positioner arm extending from a pivot point, or alternatively a plurality of positioner arms arranged in a comb-like fashion extending from a pivot point. A rotary voice coil motor (VCM) is attached to the rear portion of the actuator assembly to power movement of the actuator over the disks.

The VCM located at the rear portion of the actuator assembly is comprised of a top plate spaced above a bottom plate with a magnet or pair of magnets therebetween. The VCM further includes an electrically conductive coil disposed within the rearward extension of the actuator assembly and between the top and bottom plates, while overlying the magnet in a plane parallel to the magnet. In operation, current passes through the coil and interacts with the magnetic field of the magnet so as to rotate the actuator assembly around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

During operation of the disk drive, the actuator, driven by the VCM, is positioned radially over the disk surface under the control of a positioning servo system. The servo system is designed to accurately position the read/write transducer over a selected data track on the disk in as short a time as possible. The actuators of most disk drive systems have at least two positioner arms, an outer upper positioner arm (outer upper arm) and an outer lower positioner arm (outer lower arm) so that data may be written to and read from both surfaces of the disk. Disk drive systems having more than one disk have actuators with one or two outer arms and at least one inner positioner arm (inner arm). The outer arms each support a single suspension and corresponding slider/transducer assembly. The inner arms each support two suspensions with their slider/transducer assemblies, the suspensions being mounted in a back-to-back configuration on each side of the positioner arm.

Actuator positioner arms have resonant frequencies that can adversely affect the performance of the servo system. The dynamics of the upper outer arm and the lower outer arm are typically different than the dynamics of the inner arms due to the fact that the outer arms generally support one suspension and the inner arms support two suspensions. The different dynamics of the outer and inner arms leads to additional modes of vibration on the actuator that can degrade performance of the disk drive system.

It therefore can be seen that there is a need for an actuator that has outer and inner arms with closely matched dynamics to the inner arms to reduce the modes of vibration on the actuator that can adversely affect the performance of the disk drive.

SUMMARY OF THE INVENTION

To overcome the shortcomings of the prior art, it is an object of the present invention to provide an improved actuator that has reduced modes of vibration of the positioner arms, thereby resulting in improved performance and stability.

It is another object of the present invention to provide an improved actuator with outer arm dynamics that match the inner arm dynamics thereby reducing the modes of vibration of the actuator assembly.

In accordance with these objects, the present invention is an actuator assembly for magnetic storage disk drive systems comprising an upper outer arm and a lower outer arm and at least one inner arm. The dynamics of the upper outer arm and the lower outer arm are tuned to match the dynamics of the inner arm or arms resulting in a reduced number of vibration modes of the positioner arms on the actuator assembly. The dynamics of the outer arms are tuned to match the dynamics of the inner arms by changing the outer arm mass, stiffness or both in an appropriate manner so that the unwanted vibration modes are shifted in frequency.

In one embodiment, the actuator assembly of the present invention comprises an upper outer arm and a lower outer arm of reduced thickness compared to the inner arms. In another embodiment, the upper outer arm and lower outer arm have notches at high strain energy points to reduce the stiffness of the outer actuator arms. In the preferred embodiment the upper and lower outer arms have both reduced thickness as compared to the inner arms as well as notches at high strain energy points. In this embodiment, the modifications of the outer arms are made with the object of moving unwanted vibration modes of said outer arms to coincide with an appropriate vibration mode of the inner arms.

BRIEF DESCRIPTION OF THE DRAWINGS

For a fuller understanding of the nature and advantages of the present invention, as well as the preferred mode of use, reference should be made to the following detailed description read in conjunction with the accompanying drawings. Referring now to the drawings in which like reference numbers represent corresponding parts throughout.

DETAILED DESCRIPTION OF THE PREFERRED EMBODIMENT

This invention is described in a preferred embodiment in the following description with reference to the Figures. While this invention is described in terms of the best mode for achieving this invention's objectives, it will be appreciated by those skilled in the art that variations may be accomplished in view of these teachings without deviating from the spirit or scope of the invention.

Figure 1:
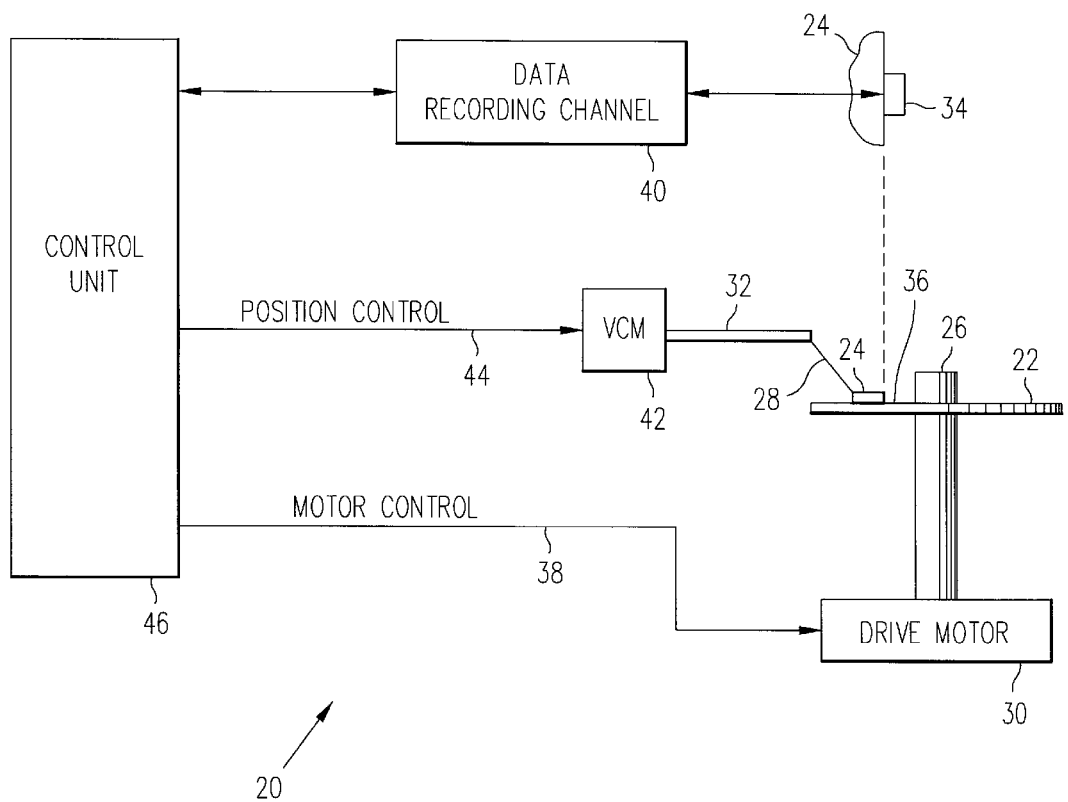
FIG. 1 is a schematic illustration of a magnetic recording disk drive system.

Referring now to FIG. 1, there is shown a schematic illustration of a disk drive 20 embodying the present invention. As shown in FIG. 1, at least one rotatable magnetic disk 22 is supported on a spindle 26 and rotated by a disk drive motor 30. The magnetic recording media on each disk is in the form of an annular pattern of concentric data tracks (not shown) on disk 22.

Figure 2:
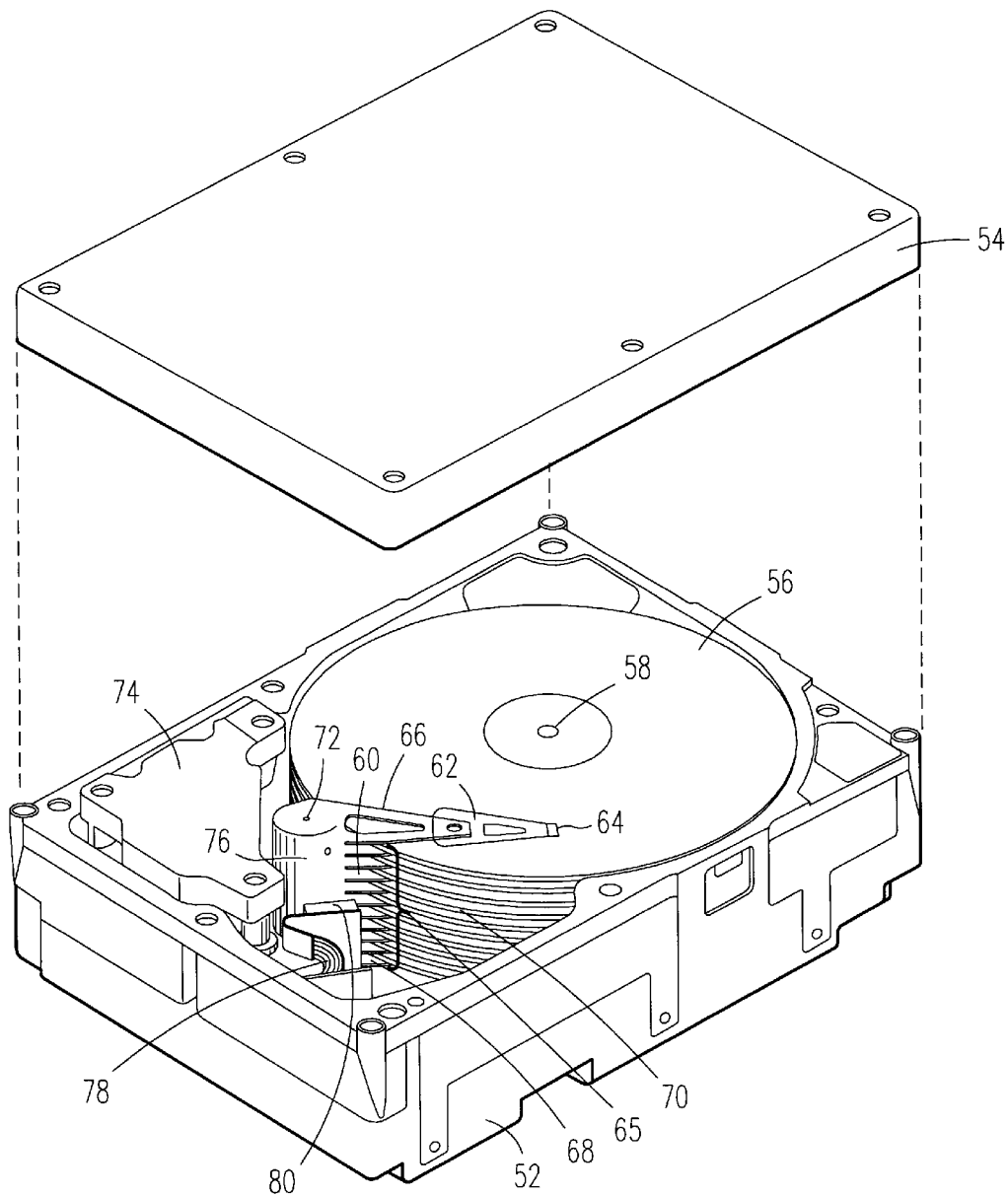
FIG. 2 is a perspective view of a disk drive.

At least one slider 24 is positioned on the disk 22, each slider 24 supporting one or more magnetic read/write heads 34. As the disks rotate, slider 24 is moved radially in and out over disk surface 36 so that heads 34 may access different portions of the disk where desired data is recorded. Each slider 24 is attached to a positioner arm 32 by means of a suspension 28. The suspension 28 provides a slight spring force which biases slider 24 against the disk surface 36. Each positioner arm 32 is attached to an actuator means 42. The actuator means as shown in FIG. 2 may be a voice coil motor (VCM). The VCM comprises a coil movable within a fixed magnetic field, the direction and speed of the coil movements being controlled by the motor current signals supplied by controller 46.

During operation of the disk drive system 20, the rotation of disk 22 generates an air bearing between slider 24 and disk surface 36 which exerts an upward force or lift on the slider. The air bearing thus counter-balances the slight spring force of suspension 28 and supports slider 24 off and slightly above the disk surface 36 by a small, substantially constant spacing during normal operation.

The various components of the disk drive system 20 are controlled in operation by control signals generated by control unit 46, such as access control signals and internal clock signals. Typically, control unit 46 comprises logic control circuits, storage means and a microprocessor. The control unit 46 generates control signals to control various system operations such as drive motor control signals on line 38 and head position and seek control signals on line 44. The control signals on line 44 provide the desired current profiles to optimally move and position slider 24 to the desired data track on disk 22. Read and write signals are communicated to and from read/write heads 34 by means of recording channel 40.

The above description of a typical magnetic disk storage system 20, and the accompanying illustration of FIG. 1 are for representation purposes only. It should be apparent that disk storage systems may contain a large number of disks and actuators, and each actuator may support a number of sliders.

FIG. 2 shows a hard disk drive designated by the general number 50. The lid 54 of the disk drive is shown exploded. In operation, the lid would be disposed on top of the housing 52.

The disk drive 50 comprises one or more magnetic disks 56. The disks may be conventional particulate or thin film recording disks, which are capable of storing digital data in concentric tracks. In a preferred embodiment, both sides of the disks 56 are available for storage, and it will be recognized by one of ordinary skill in the art that the disk drive 50 may include any number of such disks 56.

The disks 56 are mounted to a spindle 58. The spindle 58 is attached to a spindle motor (not shown) which rotates the spindle 58 and the disks 56 to provide read/write access to the various portions of the concentric tracks on the disks 56.

An actuator assembly 76 includes a positioner arm 60, and a suspension assembly 62. The suspension assembly 62 includes a slider/transducer assembly 64 at its distal end. Although only one slider/transducer assembly 64 of the suspension assembly 62 is shown, it will be recognized that the disk drive 50 has one slider/transducer assembly 64 for each side of each disk 56 included in the disk drive 50. The positioner arm 60 further comprises a pivot 72 around which the actuator assembly 76 pivots.

The disk drive 50 further includes a read/write chip 80. As is well known in the art, the read/write chip 80 cooperates with the slider transducer assembly 64 to read data from or write data to the disks 56. A flexible printed circuit member or actuator flex cable 78 carries digital signals between the read/write chip 80 and a connector pin assembly (not shown) which interfaces with the external signal processing electronics.

The main function of the actuator assembly 76 is to move the positioner arm 60 around the pivot 72. Part of the actuator assembly 76 is the voice coil motor (VCM) assembly 74 which comprises a VCM bottom plate, a magnet and a VCM top plate in combination with an actuator coil. Current passing through the actuator coil interacts with the magnetic field of the magnet to rotate the positioner arm 60 and suspension assembly 62 around the pivot 72, thus positioning the slider/transducer assembly 64 as desired.

Most disk files 50 have a number of disks 56 mounted on the spindle 58 to form a disk stack 70. The actuator assembly 76 comprises a plurality of positioner arms 60 fixed in a comb-like arrangement such that the inner arms 65 fit between the disks 56 forming disk stack 70 and the outer arms 66, 68 extend over the top surface of the top disk and the bottom surface of the bottom disk, respectively. The inner arms 65 each support two suspension assemblies 62 (upper and lower suspension assemblies) with attached slider/transducer assemblies 64. The upper outer arm 66 supports one suspension assembly 62 with its slider/transducer assembly 64 to access data on the top surface of the top disk of disk stack 70. The lower outer arm 68 supports one suspension assembly 62 with its slider/transducer assembly 64 to access data on the bottom surface of the bottom disk of disk stack 70.

Figure 3:
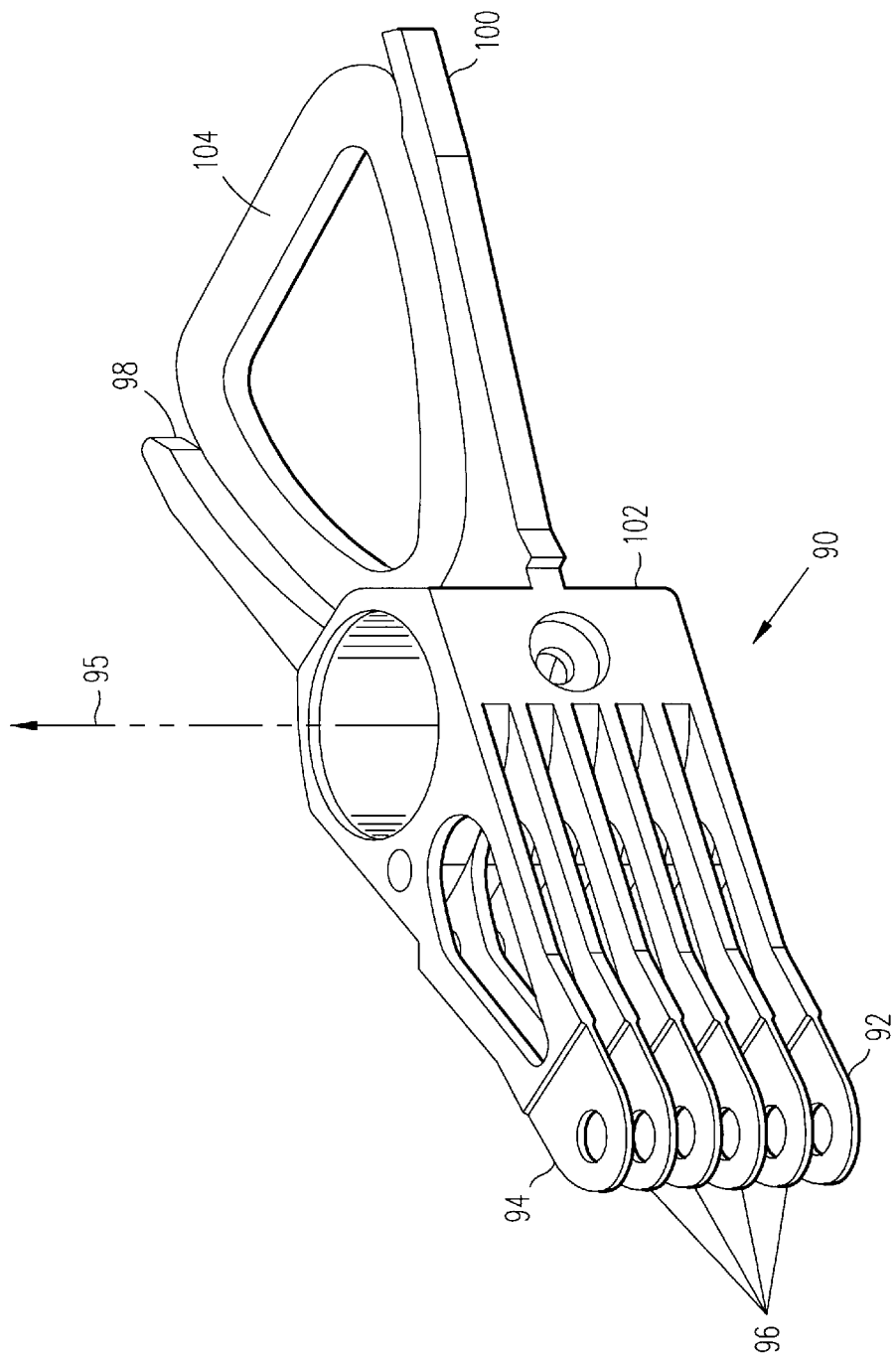
FIG. 3 is a perspective view of an actuator assembly.

FIG. 3 is a perspective view of an actuator assembly 90. The actuator assembly 90 comprises a body 102, a lower outer arm 92, an upper outer arm 94, one or more inner arms 96, and actuator coil 104 located between supporting arms 98, 100. The body 102 is supported by bearings (not shown) which allow the actuator assembly 90 to rotate about a vertical axis 95 when the actuator assembly 90 is mounted in a disk file. The body 102 supports positioner arms 92, 94, 96 which in turn support the suspension assemblies (not shown) on which slider/transducer assemblies (not shown) are fixed. The actuator coil support arms 98, 100 support the actuator coil 104 which is part of the VCM assembly which works to position the actuator assembly radially with respect to the disk surfaces.

When installed in a disk drive system, the actuator assembly 90 with suspension assemblies fixed on the positioner arms 92, 94, 96 is rotated by the VCM motor to position the slider/transducer assemblies at the desired disk radius to read or write data on a data track on the recording media coating the disk surface. The forces applied to the actuator assembly 90 by the VCM motor can excite mechanical resonances of the actuator assembly. Resonances of the actuator assembly 90 in the plane of the radial motion of the actuator assembly 90 are of particular concern since they directly affect the settling time after a seek of the slider/transducer assemblies over the desired data track. By settling time, it is meant the time for the transducer to become stably positioned over the track.

Because the outer arms 92, 94 each support one suspension assembly while the inner arms 96 each support two suspension assemblies, the outer arms have resonance modes at higher vibration frequencies. The higher frequency modes are a consequence of the lower mass supported by the outer arms 92, 94. Because these additional higher frequency modes degrade the performance of the disk file, it is desirable to alter the design of the outer arms in such a manner that the unwanted high frequency modes are lowered in frequency to coincide with the resonance modes of the inner arms 96. Lowering the frequencies of these outer arm modes can be accomplished by adding mass to the outer arms 92, 94, by removal of material at selected high stress positions on the outer arms 92, 94 or by reducing the thickness of selected portions of the outer arms 92, 94. Addition of mass to the outer arms 92, 94 is not the most desirable embodiment since additional mass on the actuator assembly 90 reduces performance of the disk drive. Nevertheless, the addition of mass to the outer arms 92, 94 so that the outer arms 92, 94 are thicker than inner arms 96 is one alternative embodiment to the present invention. However, the preferred methods of tuning the outer arm resonances to match the inner arm resonances are the removal of material at selected high stress points of the outer arm 94 and/or reducing the thickness of selected portions of the outer arms 92, 94 or some combination of the three approaches.

Figure 4:
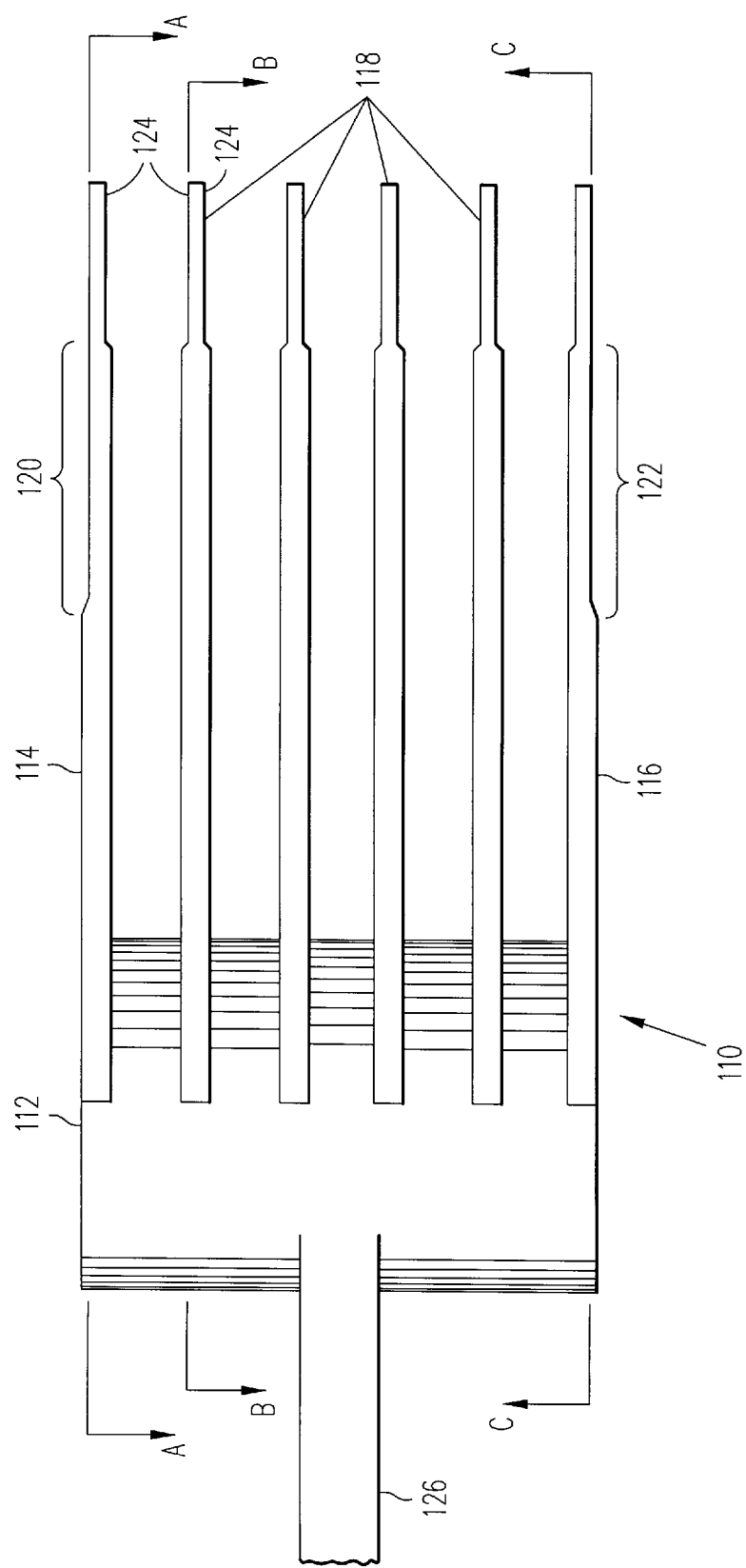
FIG. 4 is a side elevation view of an actuator assembly of an embodiment of the present invention.

Referring now to FIG. 4, one embodiment of the present invention actuator assembly 110 is shown in side elevation. Actuator assembly 110 comprises a body 112, an upper outer arm 114, a lower outer arm 116, one or more inner arms 118, and VCM coil support arms 126. The body 112 supports the positioner arms 114, 116, 118 on which suspension assemblies (not shown) are fixed on surfaces 124. Each inner arm 118 supports two suspension assemblies which access data stored on the disk surfaces rotating above and below the inner arm 118. The upper outer arm 114 supports one suspension assembly which accesses data stored on the upper surface of the top disk of the disk stack. The lower outer arm 116 supports one suspension assembly which accesses data stored on the lower surface of the bottom disk of the disk stack. In this embodiment, upper outer arm 114 has a thinned portion 120 on its upper surface and lower outer arm 116 has a thinned portion 122 on its lower surface. The thinned sections 120, 122 of the outer arms 114, 116 have reduced stiffness relative to the stiffness of the inner arms 118.

Figure 5A:
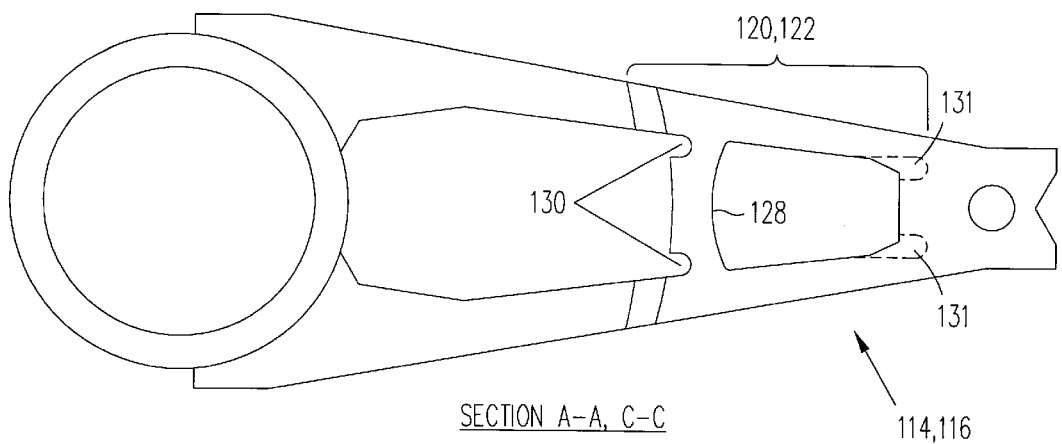
FIG. 5a is a plan view of an outer positioner arm.
Figure 5B:
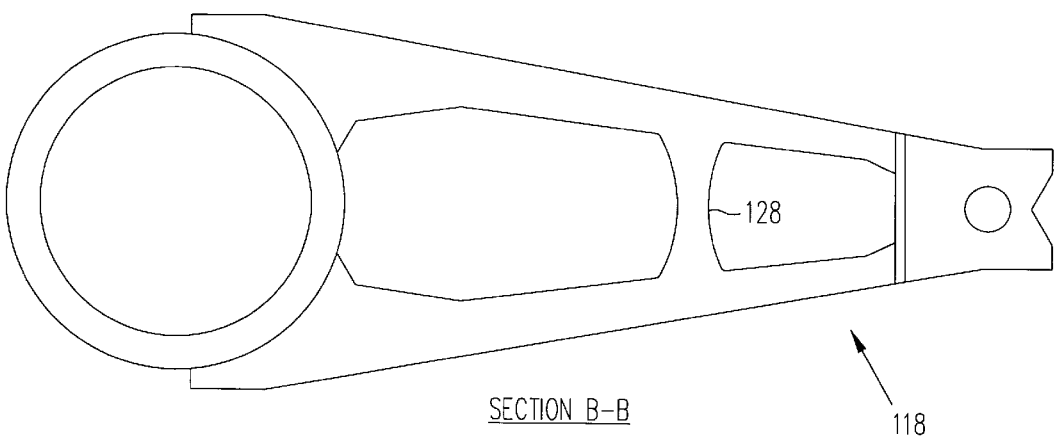
FIG. 5b is a plan view of an inner positioner arm.

Referring now to FIGS. 5a and 5b, plan views of sections of the outer arm 114 and the inner arm 118 illustrate further aspects of the best embodiment of the present invention. FIG. 5a is a plan view of section A—A of FIG. 4 of the upper outer arm 114. FIG. 5a also represents a plan view of section C—C of FIG. 4 of the lower outer arm 116. FIG. 5a shows the plan view of the thinned portion 120 of the upper outer arm 114 for section A—A or the plan view of the thinned portion 122 for section C—C. FIG. 5b is a plan view of section B—B of inner arm 118 showing that the positioner arms of the present embodiment have a cross bar 128 to add stiffness to the structure. Referring again to FIG. 5a, the cross bar 128 of the outer arms 114, 116 has material removed to form notched portions 130 at regions of high stress during in plane vibration deformation. The notched portions 130 have the effect of further decreasing the stiffness of the outer arms 114, 116 relative to the inner arms 118. Alternatively, the outer arms 114, 116 may instead have material removed to form notched portions 131 (shown in shadow) which also may be regions of high stress during deformation of the present geometry. It is understood that variations in the geometry would lead to other high stress regions which may be notched and thus within the spirit and scope of the present invention.

Figure 6:
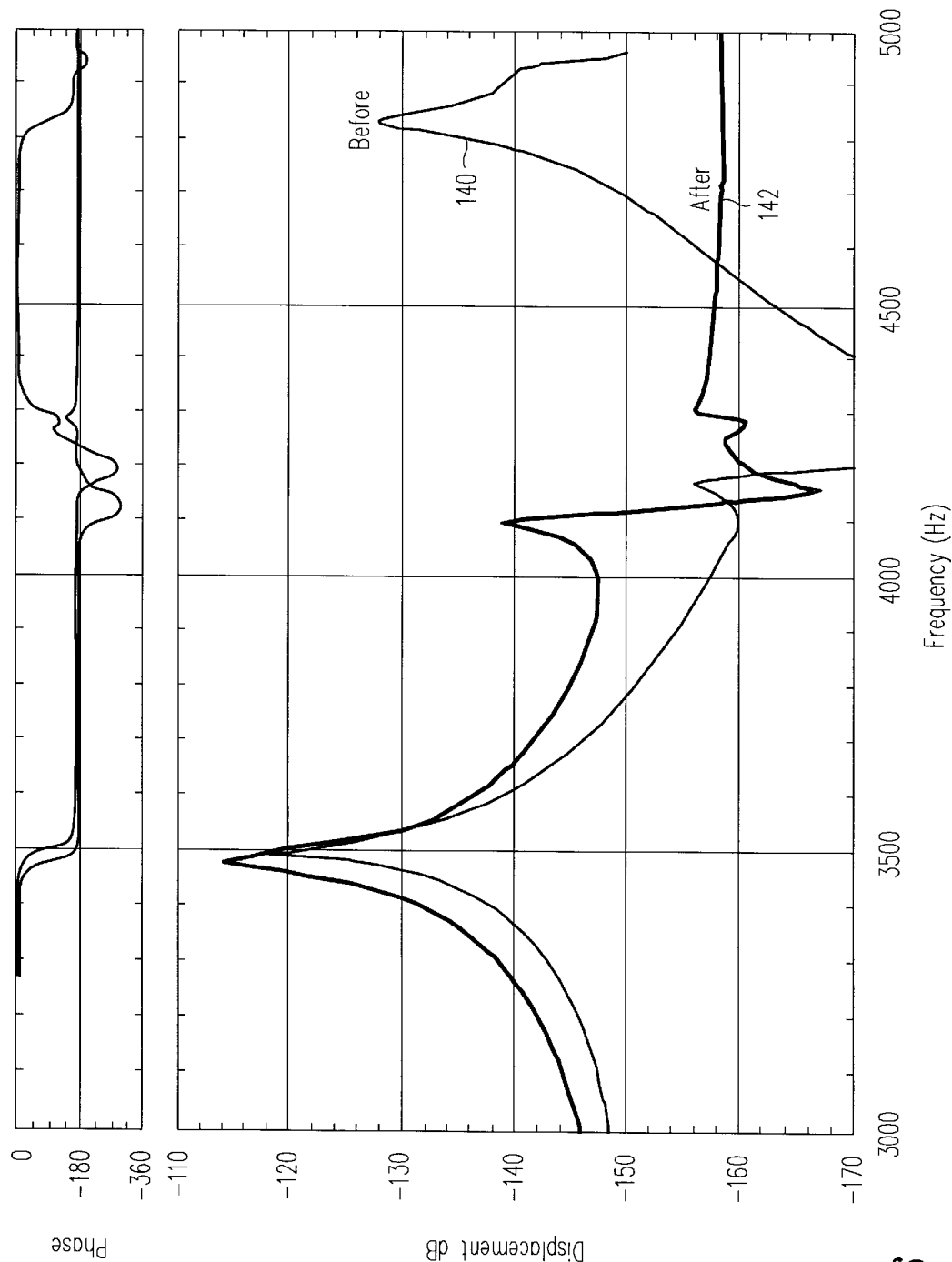
FIG. 6 is a graph showing transfer functions calculated for an outer positioner arm.

Referring now to FIG. 6, mechanical transfer functions obtained from a finite element calculation are shown for an outer arm 114, or 116 of FIG. 5a. The transfer functions are graphs showing the in plane vibration displacement amplitude response as a function of frequency to an input torque applied to the actuator assembly at the coil in the plane of actuator rotation. The two curves shown in FIG. 6 correspond to the transfer functions obtained for the outer arms 114, 116 before tuning 140 and after tuning 142, respectively, by the process of decreasing the stiffness by the methods of the present invention. For the transfer function before tuning 140, the large peak near 3500 Hz corresponds to a resonance due to a fundamental bending mode of the actuator assembly about the pivot point at the bearings. The large peak at 4800 Hz is the resonance introduced by reducing the mass of the outer arms relative to the mass of the inner arms by only supporting one suspension assembly on the outer arms. This resonance corresponds to a scissor-like mode of the outer arms relative to the inner arms. The small peak near 4200 Hz is a scissor-like mode of the inner arms. The large peak at 4800 Hz is the unwanted resonance that can be tuned by the methods of this invention to improve performance of the disk drive.

The transfer function obtained for the outer arms 114, 116 after tuning 142 shows the significant effects of reducing the outer arm stiffness on the amplitude and frequency of the 4800 Hz resonance. The frequency of the resonance has been lowered to 4300 Hz so that it now coincides with the scissor-like mode of the inner arms. In addition, the amplitude of the resulting low frequency mode is significantly lower after tuning.

Figure 7:
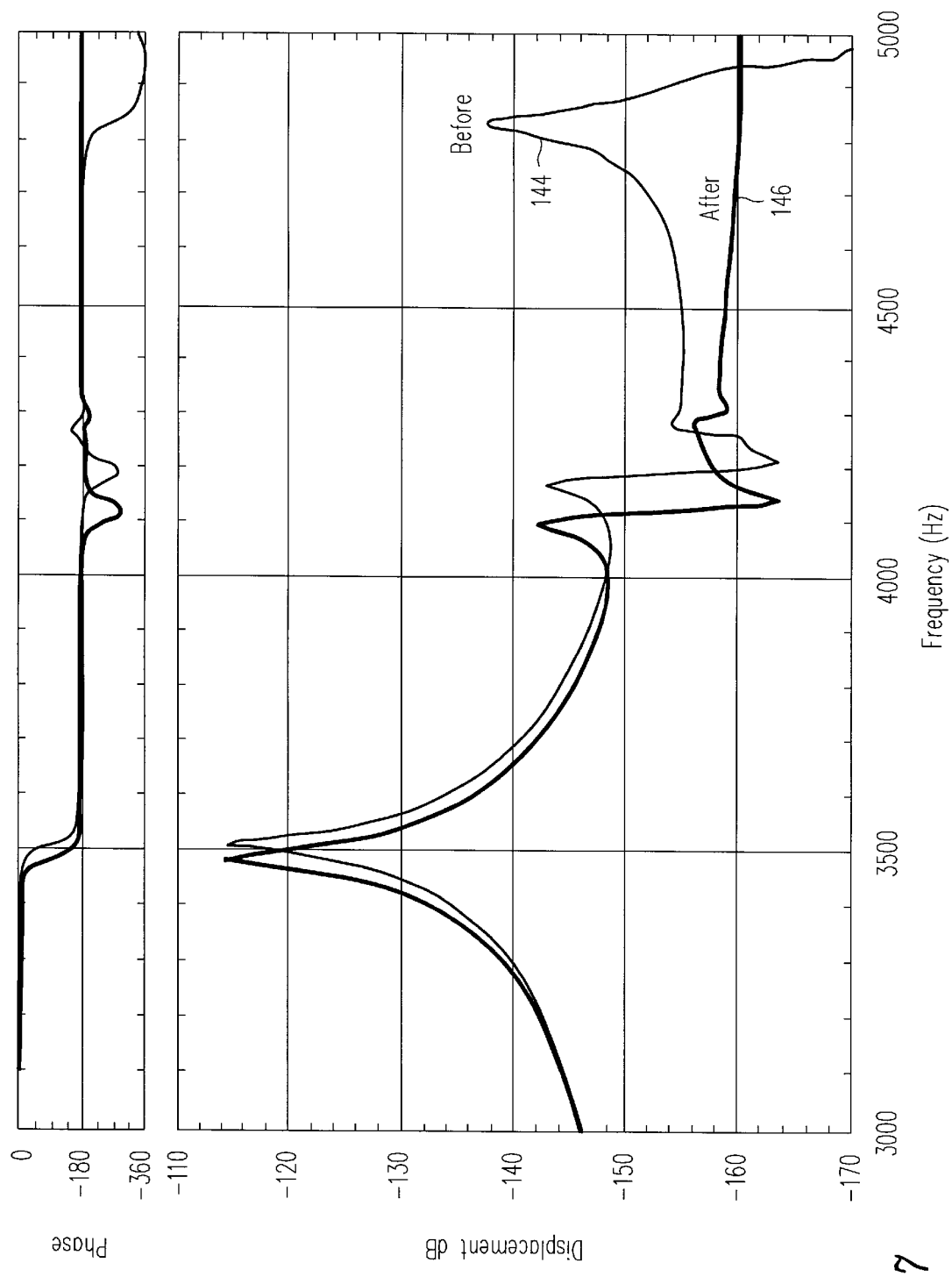
FIG. 7 is a graph showing transfer functions calculated for an inner positioner arm.

Referring now to FIG. 7, mechanical transfer function curves are shown for an inner arm 118 of FIG. 5b. The two curves shown in the Figure correspond to the in plane vibration displacement amplitude as a function of frequency for an inner positioner arm 118 obtained before tuning 144 and after tuning 146, respectively, of the stiffness of the outer arms 114, 116 by the methods of the present invention.

The transfer function before tuning 144 shows the peak at 3500 Hz corresponding to the bending mode of the actuator assembly about the pivot point and also shows peaks at 4800 Hz due to the scissor-like mode of the outer arms and at 4300 Hz due to the inner arm scissor-like mode. The transfer function after tuning 146 shows that the resonance at 4200 Hz has been shifted in frequency to 4100 Hz and that the 4800 Hz scissor-like mode of the outer arms has been lowered in frequency to overlap the 4300 Hz mode of the inner arms.

Referring now to FIGS. 6 and 7, comparison of the transfer functions 142 and 146 after tuning for the outer and inner arms, respectively, shows that the frequencies and amplitudes of resonances are nearly identical for the outer and inner arms. It can be seen that there is a reduction in the number and amplitude of the resulting modes. This data clearly demonstrates that the processes of reducing stiffness of the outer arms has the desired effect of tuning the outer arm resonances to closely match the inner arm resonances. By means of the tuning processes of this invention to reduce the number of significant modes and amplitudes of actuator assembly resonances, the performance of the servo system and therefore of the disk drive is significantly improved.

In the embodiment described herein, tuning of the outer arm resonances was accomplished by reducing the stiffness of said outer arms by two methods, by thinning portions of the outer arms and by removal of material at high stress points of the outer arms to form notches. Alternatively, the tuning of the outer arm resonances can be accomplished by addition mass to the outer arms, or any combination of the three approaches. It will be appreciated by those skilled in the art, that the same tuning results can be accomplished by using one or the other of the stiffness reducing methods of the present embodiment or by using a different balance of the two methods. It will also be appreciated by those skilled in the art, that reducing the stiffness of the outer arms can be accomplished by thinning other portions of the outer arms and by removal of material at other stress points of the outer arms than those described in this embodiment.

While the invention has been described in terms of a single preferred embodiment with optional features, those skilled in the art will recognize that the invention can be practiced with modifications within the spirit and scope of the appended claims.

What is claimed is:

1. An actuator assembly for a magnetic storage system comprising:
    a body comprising an actuator pivot point;
    an upper outer arm having a proximal end extending from the body to a distal end;
    a lower outer arm having a proximal end extending from the body to a distal end; and
    at least one inner arm extending from the body between the upper outer arm and lower outer arm;
    wherein the upper outer arm and lower outer arm have a similar thinner portion such that the overall thickness of the upper and lower outer arm is thinner than the thickness of the at least one inner arm, so that a first frequency mode of the upper outer arm and lower outer arm matches a second frequency mode of the at least one inner arm.

2. The actuator assembly of claim 1, wherein the thinner portion of the upper outer arm is located from approximately the middle of the upper outer arm to the distal end of the upper outer arm and the thinner portion of the lower outer arm is located from approximately the middle of the lower outer arm to the distal end of the lower outer arm.

3. The actuator assembly of claim 1, wherein the thinner portion of the upper outer arm is located from approximately the three-fourths the distance from the body of the upper outer arm to the distal end of the upper outer arm and the thinner portion of the lower outer arm is located from approximately three-fourths the distance from the body of the lower outer arm to the distal end of the lower outer arm.

4. The actuator assembly of claim 1, wherein the thinner portion of the upper outer arm and the thinner portion of the lower outer arm is approximately one-half the thickness of the rest of the upper outer arm and lower outer arm.

5. The actuator assembly of claim 1, wherein the thinner portion of the upper outer arm and the thinner portion of the lower outer arm is approximately one-third the thickness of the rest of the upper outer arm and lower outer arm.

6. The actuator assembly of claim 1, wherein the thinner portion of the upper outer arm and the thinner portion of the lower outer arm is approximately one-fourth the thickness of the rest of the upper outer arm and the lower outer arm.

7. The actuator assembly of claim 1, wherein the upper outer arm, lower outer arm and inner arm are further comprised of a pair of legs extending from the body to the distal end of the upper outer arm, lower outer arm and the at least one inner arm respectively, and a crossbar connecting the pair of legs, further wherein the crossbar on the upper outer arm and the cross bar of the lower outer arm have a least one similarly placed notch.

8. The actuator assembly of claim 7, wherein the crossbar of the upper outer arm and the crossbar of the lower outer arm have a pair of notches located on the crossbar where the crossbar connects to the pair of legs.

9. The actuator assembly of claim 1, further comprising at least one substantially equally positioned notch on the distal end of the upper outer arm and on the distal end of the lower outer arm.

10. The actuator assembly of claim 1, further comprising a pair of notches equally positioned on each of the distal end of the upper outer arm and on the distal end of the lower outer arm.

11. An actuator assembly for a magnetic storage system comprising:
    a body comprising an actuator pivot point;
    an upper outer arm having a pair of legs extending from a proximal end extending from the body to a distal end and a crossbar connecting the legs;
    a lower outer arm having a pair of legs extending from a proximal end extending from the body to a distal end and a crossbar connecting the legs; and
    at least one inner arm extending from the body between the upper outer arm and lower outer arm;
    wherein the upper outer arm and lower outer arm have at least one similarly located notch on the crossbar, and further wherein the upper outer arm and lower outer arm have a stiffness which is less than the stiffness of the at least one inner arm such that a first frequency mode of the upper outer arm and the lower outer arm matches a second frequency mode of the at least one inner arm.

12. The actuator assembly of claim 11, further comprising a pair of notches on the crossbar of the upper outer arm located where the crossbar connects to the legs, and a pair of notches on the crossbar of the lower outer arm located where the crossbar connects to the legs.

13. The actuator assembly of claim 11, wherein the upper outer arm and the lower outer arm have a similar thinner portion such that the overall thickness of the upper and lower outer arm is thinner than the the thickness of the at least one inner arm.

14. The actuator assembly of claim 13, wherein the thinner portion of the upper outer arm is located from approximately the middle of the upper outer arm to the distal end of the upper outer arm and the thinner portion of the lower outer arm is located from approximately the middle of the lower outer arm to the distal end of the lower outer arm.

15. The actuator assembly of claim 13, the thinner portion of the upper outer arm is located from approximately three-fourths the distance from the body of the upper outer arm to the distal end of the upper outer arm and the thinner portion of the lower outer arm is located from approximately three-fourths the distance from the body of the lower outer arm to the distal end of the lower outer arm.

16. The actuator assembly of claim 13, wherein the thinner portion of the upper outer arm and the thinner portion of the lower outer arm is approximately one-half the thickness of the rest of the upper outer arm and lower outer arm.

17. The actuator assembly of claim 13, wherein the thinner portion of the upper outer arm and the thinner portion of the lower outer arm is approximately one-third the thickness of the rest of the upper outer arm and lower outer arm.

18. The actuator assembly of claim 13, wherein the thinner portion of the upper outer arm and the thinner portion of the lower outer arm is approximately one-fourth the thickness of the rest of the upper outer arm and the lower outer arm.

19. A magnetic storage system comprising
a disk with a data surface of concentric data tracks;
a spindle shaft supporting said disk, said spindle shaft for rotating said disk about an axis generally perpendicular to the disk;
a slider maintained in operative relationship with the data surface when the disk is rotating;
a transducer attached to the slider for reading data from and writing data to the data surface;
an electronics module for processing data read from and written to the data surface;
an actuator for moving the slider generally radially relative to the disk to allow the transducer to access the data tracks, the actuator further comprising a body defining an actuator pivot point; an upper outer arm having a proximal end extending from the body to a distal end; a lower outer arm having a proximal end extending from the body to a distal end; and at least one inner arm extending from the body between the upper outer arm and lower outer arm; wherein the upper outer arm and lower outer arm have a similar thinner portion such that the overall thickness of the upper and lower outer arm is thinner than the thickness of the at least one inner arm, so that a first frequency mode of the upper outer arm and lower outer arm matches a second frequency mode of the at least one inner arm.

20. The magnetic storage system of claim 19, wherein the thinner portion of the upper outer arm is located from approximately the middle of the upper outer arm to the distal end of the upper outer arm and the thinner portion of the lower outer arm is located from approximately the middle of the lower outer arm to the distal end of the lower outer arm.

21. The magnetic storage system of claim 19, wherein the thinner portion of the upper outer arm is located from approximately three-fourths the distance from the body of the upper outer arm to the distal end of the upper outer arm and the thinner portion of the lower outer arm is located from approximately three-fourths the distance from the body of the lower outer arm to the distal end of the lower outer arm.

22. The magnetic storage system of claim 19, wherein the thinner portion of the upper outer arm and the thinner portion of the lower outer arm is approximately one-half the thickness of the rest of the upper outer arm and lower outer arm.

23. The magnetic storage system of claim 19, wherein the thinner portion of the upper outer arm and the thinner portion of the lower outer arm is approximately one-third the thickness of the rest of the upper outer arm and lower outer arm.

24. The magnetic storage system of claim 19, wherein the thinner portion of the upper outer arm and the thinner portion of the lower outer arm is approximately one-fourth the thickness of the rest of the upper outer arm and the lower outer arm.

25. The magnetic storage system of claim 19, wherein the upper outer arm, lower outer arm and inner arm are further comprised of a pair of legs extending from the body to the distal end of the upper outer arm, lower outer arm and the at least one inner arm respectively, and a crossbar connecting the pair of legs, further wherein the crossbar on the upper outer arm and the crossbar of the lower outer arm have a least one similarly placed notch.

26. The magnetic storage system of claim 25, wherein the crossbar of the upper outer arm and the crossbar of the lower outer arm have a pair of notches located on the crossbar where the crossbar connects to the pair of legs.

27. The magnetic storage system of claim 19, further comprising at least one substantially equally positioned notch on the distal end of the upper outer arm and on the distal end of the lower outer arm.

28. The magnetic storage system of claim 19, further comprising a pair of notches equally positioned on each of the distal end of the upper outer arm and on the distal end of the lower outer arm.

29. A magnetic storage system comprising
a disk with a data surface of concentric data tracks;
a spindle shaft supporting said disk, said spindle shaft for rotating said disk about an axis generally perpendicular to the disk;
a slider maintained in operative relationship with the data surface when the disk is rotating;
a transducer attached to the slider for reading data from and writing data to the data surface;
an electronics module for processing data read from and written to the data surface;
an actuator for moving the slider generally radially relative to the disk to allow the transducer to access the data tracks, the actuator further comprising a body defining an actuator pivot point; an upper outer arm having pair of legs extending from a proximal end extending from the body to a distal end and a crossbar connecting the legs; a lower outer arm having a pair of legs extending from a proximal end extending from the body to a distal end and a crossbar connecting the legs; and at least one inner arm extending from the body between the upper outer arm and lower outer arm; wherein the upper outer arm and lower outer arm have at least one similarly located notch on the crossbar, and further wherein the upper outer arm and the lower outer arm have a stiffness which is less than the stiffness of the at least one inner arm such that a first frequency mode of the upper outer arm and the lower outer arm matches a second frequency mode of the at least one inner arm.

30. The magnetic storage system of claim 29, further comprising a pair of notches on the crossbar of the upper outer arm located where the crossbar connects to the legs, and a pair of notches on the crossbar of the lower outer arm located where the crossbar connects to the legs.

31. The magnetic storage system of claim 29, wherein the upper outer arm and the lower outer arm have a similar thinner portion such that the overall thickness of the upper and lower outer arm is thinner than the thickness of the at least one inner arm.

32. The magnetic storage system of claim 31, wherein the thinner portion of the upper outer arm is located from approximately the middle of the upper outer arm to the distal end of the upper outer arm and the thinner portion of the lower outer arm is located from approximately the middle of the lower outer arm to the distal end of the lower outer arm.

33. The magnetic storage system of claim 31, wherein the thinner portion of the upper outer arm is located from approximately three-fourths the distance from the body of the upper outer arm to the distal end of the upper outer arm and the thinner portion of the lower outer arm is located from approximately three-fourths the distance from the body of the lower outer arm to the distal end of the lower outer arm.

34. The magnetic storage system of claim 31, wherein the thinner portion of the upper outer arm and the thinner portion of the lower outer arm is approximately one-half the thickness of the rest of the upper outer arm and lower outer arm.

35. The magnetic storage system of claim 31, wherein the thinner portion of the upper outer arm and the thinner portion of the lower outer arm is approximately one-third the thickness of the rest of the upper outer arm and lower outer arm.

36. The magnetic storage system of claim 31, wherein the thinner portion of the upper outer arm and the thinner portion of the lower outer arm is approximately one-fourth the thickness of the rest of the upper outer arm and the lower outer arm.

37. A method of reducing the modes of vibration of an actuator in a magnetic storage system to improve performance and stability comprising the steps of:

providing an actuator having an upper outer arm, a lower outer arm and at least one inner arm all extending from an actuator pivot point; and thinning similar portions of the upper outer arm and the lower outer arm so that the thinner portions are thinner than the thickness along most of the entire inner arm, so that vibration modes of the upper outer arm and the lower outer arm coincide with an appropriate vibration mode of the at least one inner arm.

38. The method of reducing the modes of vibration of an actuator in a magnetic storage system as set forth in claim 37, wherein approximately one-half of the upper and lower outer arms is thinned.

39. The method of reducing the modes of vibration of an actuator in a magnetic storage system as set forth in claim 37, wherein approximately one-third of the upper and lower outer arms is thinned.

40. The method of reducing the modes of vibration of an actuator in a magnetic storage system as set forth in claim 37, wherein approximately one-fourth of the upper and lower outer arms is thinned.

41. The method of reducing the modes of vibration of an actuator in a magnetic storage system as set forth in claim 37, further comprising the step of notching similar or the same locations on the upper outer arm and the lower outer arm.

42. A method of reducing the modes of vibration of an actuator in a magnetic storage system to improve performance and stability comprising the steps of:

providing an actuator having an upper outer arm, a lower outer arm and at least one inner arm all extending from an actuator pivot point; and notching the same or similar portions of the upper outer arm and the lower outer arm so that the stiffness of the upper outer arm and lower outer arm are reduced similarly, and to match the stiffness of the inner arm such that a first frequency mode of the upper outer arm and the lower outer arm matches a second frequency mode of the at least one inner arm.

43. The method of reducing the modes of vibration of an actuator in a magnetic storage system as called for in claim 42, further comprising the step of thinning the same or similar portions of the upper outer arm and the lower outer arm.

44. A method of reducing the modes of vibration of an actuator in a magnetic storage system to improve performance and stability comprising the steps of:

providing an actuator having an upper outer arm, a lower outer arm and at least one inner arm all extending from an actuator pivot point; and thickening similar portions of the upper outer arm and the lower outer arm so that the thicker portions are thicker than the thickness along most of the entire inner arm such that a first frequency mode of the upper outer arm and the lower outer arm matches a second frequency mode of the at least one inner arm.

* * * * *